United States Patent [19]

Glassmeyer

[11] 4,230,335
[45] Oct. 28, 1980

[54] TELESCOPING DRAWBAR FOR TANDEM TRACTOR TRAILERS

[75] Inventor: John J. Glassmeyer, Glenwood, Ill.

[73] Assignee: Pullman Incorporated, Chicago, Ill.

[21] Appl. No.: 14,185

[22] Filed: Feb. 22, 1979

[51] Int. Cl.³ .............................................. B62D 53/04
[52] U.S. Cl. .................................. 280/423 A; 280/482
[58] Field of Search .................... 280/404, 423 A, 475, 280/476 R, 482, 491 A; 248/188.5, 333; 211/105.3; 138/120; 403/109, 376, 377, 378, 379

[56] References Cited

U.S. PATENT DOCUMENTS

| | | | |
|---|---|---|---|
| 1,536,751 | 5/1925 | Barnes | 280/482 |
| 1,563,860 | 12/1925 | Jacobson | 280/482 |
| 2,447,737 | 8/1948 | Christensen | 280/482 |
| 2,451,698 | 10/1948 | Swinehart | 280/482 |
| 3,717,363 | 2/1973 | Berends | 280/476 |
| 3,746,369 | 7/1973 | Neff | 280/476 R |
| 3,827,723 | 8/1974 | Neff | 280/423 A |

Primary Examiner—John J. Love
Assistant Examiner—Randall A. Schrecengost
Attorney, Agent, or Firm—Richard J. Myers

[57] ABSTRACT

A telescoping drawbar is provided to insure a variable length connection between a pulled trailer and a tandem connected trailer supported on a portable dolly. The telescoping drawbar includes a number of telescoped tube segments which are aligned and secured with interlocking wedges, plates and mating stops located on the surfaces of overlapping telescoping sections. The wedge-shaped plates and associated stops securely interlock the telescoping sections and accurately align locking openings for insertion of locking bolts.

21 Claims, 8 Drawing Figures

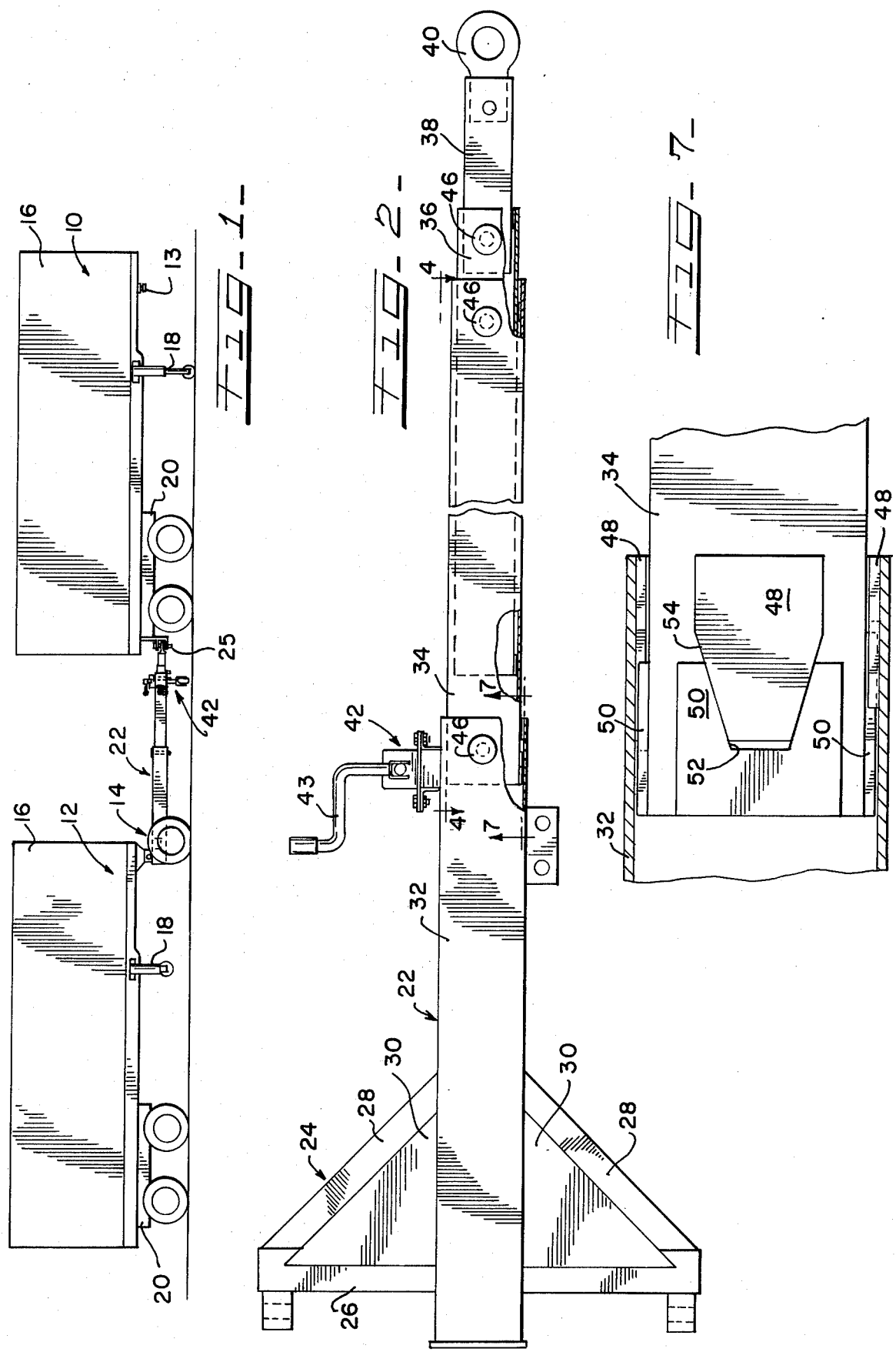

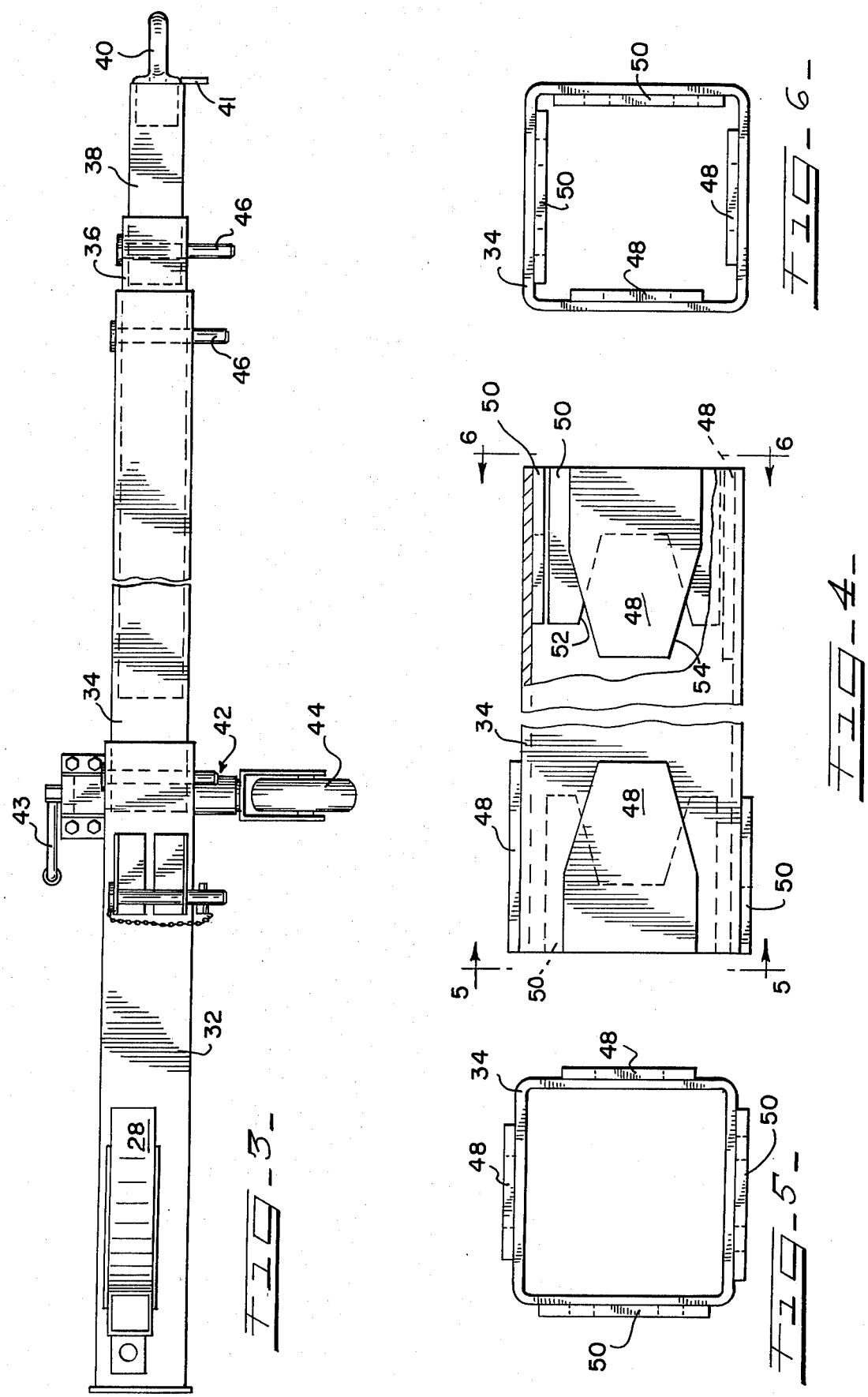

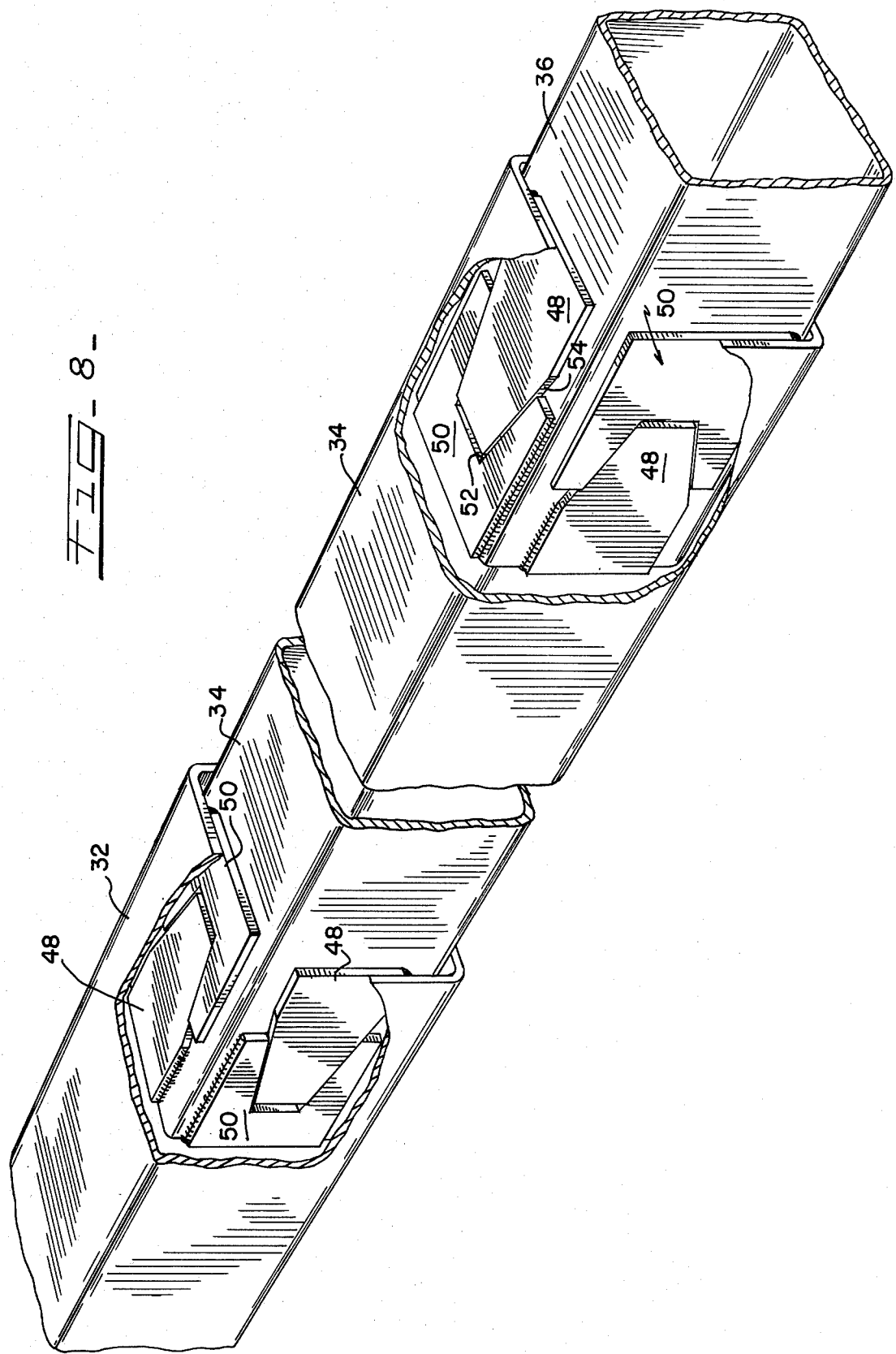
FIG-8-

TELESCOPING DRAWBAR FOR TANDEM TRACTOR TRAILERS

BACKGROUND OF THE INVENTION

1. Field of the Invention

This invention pertains to over-the-road semitrailer trucks and in particular to a tandem arrangement of trucks wherein a lead truck pulls a second, tandem-connected truck which is supported by a dolly connected to the pulling truck with drawbar. This disclosure deals with a new and improved drawbar for securely interconnecting the two trailers.

2. Description of the Prior Art

Because of varying state regulations regarding spacing between axles of tandem trailers, it is necessary to provide a drawbar interconnecting the two trailers that has the capability of being adjusted to different lengths. Telescoping members are easily adjusted, however, as with any telescoping members there can be excessive vertical deflection as well as lateral swaying during transit and which must be limited to properly control movement of the second trailer and to prevent premature failure and wear of the telescoping drawbar. While telescoping drawbars have been disclosed in the art such as that shown in U.S. Pat. No. 3,717,363 (1973) to H. Berends, problems can occur when such a complicated mechanism is provided. Further, the patent referred to, while providing internal stops which limit extension of the telescoping tubes, the internal stops do not provide automatic alignment of locking openings and do not provide a feature of securely fitting together telescoping members.

SUMMARY OF THE INVENTION

This disclosure pertains to a telescoping drawbar having a number of pieces of telescoping tubing, each having connected thereto locking and alignment plates which include wedge-shaped portions which mate in such a fashion to securely connect the telescoping pieces and align locking openings for additional location of a mechanical fastener which positively and securely locks the drawbar in the desired, extended position.

In operation, the locking and alignment plates are located on the inside of the larger tubing and the outside of the associated smaller, telescoped piece of tubing and are positioned in such a manner that when the telescoping tubing is extended, each locking wedge will automatically mate together with a stop plate having a suitably shaped, wedge-shaped cutout welded to a smaller sized telescoping tube. Such a mated connection provides locking openings that are thereby automatically aligned. A mechanical fastener such as a high strength bolt may be positioned within the aligned openings to securely and positively secure the telescoped pieces of tubing in an extended position.

It is thus an object of the disclosure to show a drawbar arrangement for tandem trailers whereby the drawbar includes a number of telescoping segments to allow the drawbar to be adjusted in length to comply with various state regulations regarding space in between trailer axles.

Another object of the disclosure is to provide a telescoping drawbar arrangement having alignment and rigidifying members which automatically interconnect telescoping sections of tubing to prevent excessive sway and vertical deflection during transit.

Another object of the disclosure is to show telescoping drawbar arrangement wherein the telescoping segments include alignment plates having contoured, mating surfaces which mesh together and securely interconnect the adjacent telescoped pieces of tubing and provide for alignment of locking openings within the associated pieces of telescoping tubing.

These and other objects will become apparent to those having ordinary skill in the art with reference to the following drawings, description and appended claims.

BRIEF DESCRIPTION OF THE DRAWINGS

FIG. 1 is an elevational view showing tandem trailers and the connecting, telescoping drawbar;

FIG. 2 is a top view shown in the drawbar illustrated in FIG. 1;

FIG. 3 is an enlarged elevational view of the drawbar shown in FIG. 2;

FIG. 4 is a view taken generally along lines 4—4 of FIG. 2;

FIG. 5 is a view taken along lines 5—5 of FIG. 4;

FIG. 6 is a view taken generally along lines 6—6 of FIG. 4;

FIG. 7 is a view taken generally along lines 7—7 of FIG. 2; and

FIG. 8 is an enlarged pictorial illustration showing the locking and aligning components used with the telescoping members.

DESCRIPTION OF THE PREFERRED EMBODIMENT

FIG. 1 shows a pair of trailers with a leading trailer 10 attached to a driven or trailing tandem connected trailer 12. Each trailer includes the usual king pin 13 for attachment to the fifth wheel of a tractor or for attachment to the fifth wheel of a dolly 14. The trailers may include a flat bed or the usual body 16 and a so-called landing gear 18 which allows for support of the trailer when not in transit. Each trailer includes a rear axle unit 20 which may be of a variety of conventional designs which are well known in the art.

Because the tandem trailer 12 is supported by a dolly, it is necessary to provide an interconnecting member to securely lock the trailer 12 to the leading trailer 10. Thus, a so-called drawbar or drawbar means 22 extends from dolly 14 to a hitch 25 of the trailer 10. As shown in FIG. 2, the drawbar 22 includes a number of individual telescoping members or sections and has a dolly-connecting frame 24 at one end to allow the drawbar to be securely attached to the trailer-supporting dolly. Connecting frame 24 includes a transverse beam 26 which is reinforced by diagonal braces 28. A reinforcing metal plate or web 30 may be used to further rigidify the connecting frame 24.

Telescoping tubular members or means comprise a first, large tube 32 which is securely attached to the connecting frame 24. Extending from the first tube 32 is a smaller, telescoping tube 34. Similarly, a smaller tube 36 fits within tube 34 and the smallest of the telescoping tubes 38 is fitted within and may extend from tube 36. As shown in FIG. 2, the end tube 38 has a hook means or an eye member 40 securely attached to the end to permit easy attachment to the trailer hitch 25. A stop bar or an locating means 41 (FIG. 3) permits easy location of the drawbar eye for connection with a pin in the hitch 25.

A wheel support or height adjustment means 42 is attached to one of the telescoping members of the drawbar 22 and is rendered adjustable with the rotating handle 43 which may be moved to raise and lower tire 44. Thus, the drawbar may be easily aligned with hitch 25 and easily stored above the ground when not in use.

Each of the telescoping tubes 32, 34, 36 and 38 has openings at each end to permit insertion of a locking pin 46. As shown in FIG. 2, when the drawbar is fully extended, three locking pins are utilized to maintain the tubing sections in a fully extended configuration. Similarly, if it is desired to shorten the length of the bar, the telescoped tubing is merely pushed within one another until associated locking openings are in alignment and a single or plurality of locking pins may be used. When the drawbar is fully collapsed, all the locking openings will be in alignment and only a single locking pin will be necessary.

This disclosure provides a simplified, reliable arrangement of plates attached to the end portion of the telescoping tubing which not only interlocks the pieces of tubing in a secure fashion, but also are used to align the locking openings prior to insertion of locking pins 46. The plates or grooved alignment member consist of a so-called stop plate 50 which includes a pair of tapered arms extending outwardly from a bottom to provide a generally modified, U-shaped opening. The stop or groove member 50 cooperates with a locking wedge or wedge member 48 which has a similarly shaped, modified, U-shaped end member and guide surfaces 54 which cooperate with guide surfaces 52 of the stop plate 50 to guide the telescoping members into a lock and align position. As shown in FIG. 8, the locking wedge 48 and stop plate 50 are arranged in an alternate manner around each end of the telescoping tube. Thus, tube 34 has one end with plates 48 and 50 arranged alternately around the outside. Likewise, tube 34 has stop or locking plates 48 and 50 also arranged in an alternate fashion at the opposite end but on the inside surface of the tube. The same construction is present on the other telescoping tube members.

Thus, it is shown that when the tubing members are extended and plates located on the outside of one telescoped tube interlock with associated tubes on the inside portion of the larger piece of associated tubing, not only do the tapered guide surfaces of wedges 48 and stops 50 guide the pieces of tubing into a secure locked relationship but such arrangement also insures that the associated locking openings are aligned for easily inserting locking pins 46. When locking pins 46 are inserted, collapse of the telescope pieces of tubing is prohibited.

The following description will show how the telescoping drawbar car be easily assembled and disassembled in the event it is desired to change the length of the various sections of the tubing or when it is necessary to repair or replace a damaged section of tubing. As shown in the illustration, a unique feature of this arrangement is that with each telescoping piece of tubing the locking and alignment plates 48, 50 are on the exterior of only one end. Referring to FIG. 8, for example, if it is desirable to remove tubing 34, 36, all that is necessary is that tubing 36 be slid completely through the overlapping pieces of tubing, 32, 34. The locking and alignment plates 48, 50 located on the exterior surface of the inside end of tube 36 will slide through the larger pieces of tubing 32, 34. Because there are no locking plates on the exterior of the opposite end of tubing 36, that end is free to slide through and pass locking plates 48, 50, which are located on the inside end of tubing 34.

Similarly, in assembling the telescoping drawbar, it is more practical and economical to preconstruct each piece of tubing as a subassembly and then assemble the fabricated tubes at the cite where final assembly takes place without the need for any welding, measuring or alignment. Thus, it is shown with the foregoing, this novel drawbar arrangement provides a positive interlocking and alignment feature between the extended pieces of tubing. The method of assembling the telescoping pieces of tubing is also unique insofar as it is economical and accomplished quickly and also provides an arrangement that may be easily disassembled for repair or replacement of any of the telescoping segments.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. A telescoping connection extending from a dolly for use in connecting a leading trailer to a tandem-connected trailer, the improvement comprising:
    a drawbar,
    said drawbar comprising tubular means with portions telescoped to overlap each other,
    said tubular means comprising a first tubular section with means securely attached to said dolly and having end means spaced from said dolly and providing an inside surface,
    said tubular means comprising second tubular section with a connecting end fitted within the said first tubular section,
    said second tubular section having a telescoped end having an outside surface,
    locking and alignment means with means attached to said inside surface of the end means of the first tubular section, and, associated locking and alignment means attached to the outside surface of the telescoped end of the second tubular section,
    said locking and alignment means providing cooperating guide surface means for accurately positioning the ends of the first and second tubular sections,
    said guide surface means providing a locking arrangement between the first and second tubular sections when the guide surface means are in contact,
    each locking and alignment means comprising:
    locking wedge means rigidly affixed to one section of said tubular means and having guide surfaces extending in a tapered fashion, and
    stops means on the other section having a substantially U-shaped cutout and providing inclined surfaces for cooperation with said locking wedge in locking and aligning the tubular sections.

2. A telescoping connection extending from a dolly for use in connecting a leading trailer to a tandem-connected trailer, the improvement comprising:
    a drawbar,
    said drawbar comprising tubular means with portions telescoped to overlap each other,
    said tubular means comprising a first tubular section with means securely attached to said dolly and having end means spaced from said dolly and providing an inside surface, said tubular means comprising second tubular section with a connecting end fitted within the said first tubular section, said second tubular section having a telescoped end having an outside surface, locking and alignment means with means attached to said surface of the end means of the first tubular section, and, associated locking and alignment means attached to the outside surface of the telescoped end of the second tubular means, said locking and alignment means providing cooperating guide surface means for accurately positioning the ends of the first and second tubular means, said guide surface means providing a locking arrangement between the first and second tubular means when the guide surfaces are in contact, said locking and alignment means comprising:

first plate means and second plate means spaced about the end portion of one of the tubular sections in alternate fashion on the outside surface of said one tubular section, and mating sections of wedges and stops located on the inside surface of the other tubular section for operatively receiving inmating fashion on the first and second plate means outside surface of the telescoped one tubular section.

3. In a portable trailer dolly for connection between a leading trailer and a trailing tandem connected trailer and extendable drawbar means comprising:

a first larger in cross section tubular means, a second smaller in cross section tubular means telescopically reciprocable within the larger member along a substantially common axis of both first and second tubular means, said larger tubular means and said smaller tubular means having constraining means presenting obstructing tubular areas preventing each tubular means from relative rotation with respect to each other while permitting extension and contraction of one tubular means with the other, each tubular means being provided with a locking means and locking structure cooperative with the locking means for locking the tubular means in immobilizing relationship as to each other in the extended positions of the drawbar means, said first tubular means being connectable with the dolly and said second tubular means being connectable with the leading trailer, said larger tubular means and said smaller tubular means each having a trailing end portion and a leading end portion, said larger tubular means leading end portion having first stop means on the interior thereof and said smaller tubular means trailing end portion having second stop means on the axially extending exterior thereof engaging with the first stop means in the extended position of the drawbar means without rotating one tubular means with respect to the other, and said first and second stop means being disengageable from one another in the collapsed position of the drawbar means attendant to separation of both tubular means from each other without rotating one tubular means with respect to the other.

4. The invention according to claim 3, and the smaller tubular means being substantially contained with the larger tubular means in the collapsed position of the drawbar means.

5. The invention according to claim 3, and said drawbar means including a dolly frame being connectable with said driven trailer and with said larger tubular means, and said drawbar means further including a forward hook means adapted for engagement with the leading trailer and being connectable with said smaller tubular means.

6. The invention according to claim 5, locating means being provided with a stop bar operatively associated with said hook means and operative to align said hook means in coupling same with the leading trailer.

7. The invention according to claim 3, and 'said drawbar means being provided with a height adjustment means for ground supporting of said tubular means and operatively connectable with each of said tubular means intermediate the ends of the drawbar means.

8. The invention according to claim 3, and said locking means including apertures in each of the tubular means and locking structure including pin means insertible in the apertures to preclude the telescoping action of the tubular means.

9. The invention according to claim 3, and further larger tubular means of greater cross section than said larger tubular means and first stop structure on the interior of its end, said larger tubular means trailing end portion having second stop structure on the outside surface thereof and engageable with the first stop structure of the further tubular means in the extended positions of the larger and the further larger tubular means.

10. The invention according to claim 3, and further smaller means of lesser cross section than said smaller tubular means and a first stop unit on the exterior of its end, said smaller tubular means leading end portion having a second stop unit on the inside surface thereof and engageable with the first stop unit of the further smaller tubular means.

11. The invention according to claim 3, and further larger tubular means of greater cross section than said larger tubular means and first stop structure on the interior of its end, said larger tubular means trailing end portion having second stop structure on the outside surface thereof and engageable with the first stop structure of the further tubular means in the extended position of the larger and the further larger tubular means, further smaller means of lesser cross section than said smaller tubular means and a first stop unit on the exterior of its end, and said smaller tubular means leading end portion having a second stop unit on the inside surface thereof and engagable with the first stop unit of the further smaller tubular means.

12. The invention according to claim 3, and said first and second stop means including wedge members on one tubular means and grooved alignment members on the other tubular means engagable with said wedge members attendant to locking and aligning each of the tubular means with one another to provide transaxial motion stabilization of each tubular means with respect to each other.

13. The invention according to claim 3, and each of said stop means including a plurality of aligning means disposed peripherally about the axis of the tubular means and at the end of each tubular means.

14. The invention according to claim 13, and
said aligning means including alternately spaced grooved aligning members and wedge members.

15. The invention according to claim 14, and
said aligning means being at each end of the tubular means.

16. The invention according to claim 15, and
each groove member being aligned in the same plane with a groove member at the other end and each wedge member being in axial alignment with a wedge member at the other end.

17. The invention according to claim 14, and
said wedge and groove members being on the outside surface of the tubular means at one end and on the inside surface thereof at the other end.

18. The invention according to claim 3, and
each of said tubular means constraining including surfaces and being of a generally rectangular shape.

19. The invention according to claim 3, and
said constraining means on each of said tubular means including generally angulated surfaces providing abutting surface portions preventing rotational movement of one tubular means with respect to the other.

20. The invention according to claim 14, and
said wedge and groove members being spaced perpendicular to each other in an alternating pattern on each tubular means and engagable with the complementary wedge and groove members on the other co-acting tubular means.

21. An extendable drawbar means mounted on a portable dolly for connection between a leading trailer and a tandem connected driven trailer and comprising:
a plurality of drawbar members each of which being in an essentially tubular shape,
said members being telescopically interconnected with one another,
said drawbar means including the largest in cross section member being attached to the dolly and the smallest member to the leading trailer,
said largest member being able to contain substantially within itself at least one member when said drawbar is in a collapsed position,
locking and alignment means for self-locking without rotating of said members in the fully extended position and providing self-alignment thereof with said last mentioned means being disposed on the inside and outside surfaces of said members,
said locking and alignment means being fixedly and immobilizingly attached to said members,
whereas said locking and alignment means disposed on the outer surfaces of said members being engagable with the associated locking and alignment means disposed on the inside surfaces of said co-acting members,
said locking means having means on each member co-acting with one another to prevent separation and relative rotation of the members when the drawbar is linearly moved into its extended position and allowing collapse of the members when the drawbar is linearly moved into its retracted position, and
each drawbar member being provided with a lock means and lock structure, co-operative with the lock means for locking the drawbar means in immobilizing relationship as to each other in the collapsed and extended positions of the drawbar means.

* * * * *